United States Patent
Siddiqui

(10) Patent No.: US 9,541,962 B2
(45) Date of Patent: Jan. 10, 2017

(54) MOBILE COMPUTING DEVICE HAVING A FLEXIBLE HINGE STRUCTURE

(71) Applicant: Microsoft Technology Licensing, LLC, Redmond, WA (US)

(72) Inventor: Kabir Siddiqui, Sammamish, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 104 days.

(21) Appl. No.: 14/515,766

(22) Filed: Oct. 16, 2014

(65) Prior Publication Data

US 2016/0109908 A1    Apr. 21, 2016

(51) Int. Cl.
  G06F 1/16   (2006.01)
  H04M 1/02   (2006.01)
  E05D 1/00   (2006.01)

(52) U.S. Cl.
  CPC ......... G06F 1/1681 (2013.01); E05D 1/00 (2013.01); G06F 1/1618 (2013.01); G06F 1/1652 (2013.01); G06F 1/1679 (2013.01); H04M 1/0216 (2013.01); H04M 1/0268 (2013.01)

(58) Field of Classification Search
  CPC combination set(s) only.
  See application file for complete search history.

(56) References Cited

U.S. PATENT DOCUMENTS

| | | | | |
|---|---|---|---|---|
| 6,377,324 B1* | 4/2002 | Katsura | ............ | G02F 1/133305 349/58 |
| 6,577,496 B1* | 6/2003 | Gioscia | ................ | G06F 1/1616 345/156 |
| 7,032,984 B2* | 4/2006 | Kim | ...................... | G06F 1/1601 312/223.2 |
| 8,355,755 B2* | 1/2013 | Kim | ...................... | G06F 1/1616 455/425 |
| 8,654,095 B1* | 2/2014 | Cho | ...................... | G06F 1/1652 345/173 |
| 8,787,016 B2* | 7/2014 | Rothkopf | ............ | H04M 1/0216 361/679.02 |

(Continued)

FOREIGN PATENT DOCUMENTS

| | | |
|---|---|---|
| EP | 2728432 | 5/2014 |
| EP | 2765479 | 8/2014 |

OTHER PUBLICATIONS

Khalilbeigi, et al., "FoldMe: Interacting with Double-sided Foldable Displays", In Proceedings of the Sixth International Conference on Tangible, Embedded and Embodied Interaction, Feb. 19, 2012, 8 pages.

(Continued)

*Primary Examiner* — Lisa Lea Edmonds
(74) *Attorney, Agent, or Firm* — Qudus Olaniran; Judy Yee; Micky Minhas

(57) ABSTRACT

Techniques involving a mobile computing device having a flexible hinge structure are described. In one or more implementations, a mobile computing device includes a plurality of housings, a display device that is flexible, and a flexible hinge structure. The flexible hinge structure secures the plurality of housings to each other, permits the plurality of housings to rotate about an axis in relation to each other, and supports a continuous viewing area of the display device that extends across the plurality of housings and the flexible hinge structure.

20 Claims, 16 Drawing Sheets

(56) References Cited

U.S. PATENT DOCUMENTS

| | | | | |
|---|---|---|---|---|
| 8,804,324 B2* | 8/2014 | Bohn | G06F 1/1616 | 345/1.1 |
| 8,804,349 B2* | 8/2014 | Lee | G06F 1/1641 | 361/679.01 |
| 8,873,225 B2* | 10/2014 | Huitema | G06F 1/1615 | 345/168 |
| 8,908,365 B2* | 12/2014 | Walters | G09F 19/00 | 312/319.2 |
| 8,971,031 B2* | 3/2015 | Mok | G06F 1/1652 | 349/58 |
| 8,971,032 B2* | 3/2015 | Griffin | G06F 1/1616 | 345/156 |
| 9,013,864 B2* | 4/2015 | Griffin | H04M 1/0216 | 16/382 |
| 9,064,431 B2* | 6/2015 | Ahn | G09F 9/33 | |
| 9,173,287 B1* | 10/2015 | Kim | H05K 1/028 | |
| 9,173,288 B1* | 10/2015 | Kim | G06F 1/1633 | |
| 9,176,535 B2* | 11/2015 | Bohn | G06F 1/1641 | |
| 9,235,239 B2* | 1/2016 | van Dijk | G06F 1/1652 | |
| 2004/0026514 A1* | 2/2004 | Yavid | G02B 26/101 | 235/472.01 |
| 2006/0146488 A1* | 7/2006 | Kimmel | G06F 1/1616 | 361/679.04 |
| 2010/0064244 A1 | 3/2010 | Kilpatrick et al. | | |
| 2010/0201604 A1 | 8/2010 | Kee et al. | | |
| 2012/0044620 A1* | 2/2012 | Song | G06F 1/1616 | 361/679.01 |
| 2012/0307423 A1 | 12/2012 | Bohn et al. | | |
| 2012/0314399 A1 | 12/2012 | Bohn et al. | | |
| 2013/0010405 A1 | 1/2013 | Rothkopf et al. | | |
| 2013/0058063 A1 | 3/2013 | O'Brien | | |
| 2014/0328041 A1* | 11/2014 | Rothkopf | H04M 1/0216 | 361/807 |
| 2014/0355195 A1* | 12/2014 | Kee | G06F 1/1616 | 361/679.27 |
| 2015/0023030 A1* | 1/2015 | Tsukamoto | G06F 1/1652 | 362/419 |
| 2015/0055287 A1* | 2/2015 | Seo | G06F 1/1652 | 361/679.27 |
| 2015/0153780 A1* | 6/2015 | Maatta | G06F 1/1656 | 361/679.27 |
| 2015/0185782 A1* | 7/2015 | Kim | G06F 1/1652 | 349/12 |
| 2015/0261259 A1* | 9/2015 | Endo | G06F 1/1652 | 361/679.06 |
| 2015/0361696 A1* | 12/2015 | Tazbaz | H04M 1/022 | 361/679.27 |
| 2015/0378397 A1* | 12/2015 | Park | G06F 1/1652 | 361/679.27 |
| 2016/0062408 A1* | 3/2016 | Lee | G06F 1/1641 | 345/173 |

OTHER PUBLICATIONS

Chan, Andre, "Samsung Offers Us a Glimpse of What Future Mobile Devices Could Look Like", Published on: Nov. 6, 2013, 6 pages, Available at: http://www.mobile88.com/news/international/samsung-curved-smartphone-handphone-malaysia/.

Gloriast, "Folding tablet", Published on: Nov. 22, 2012, 16 pages Available at: http://itechfuture.com/folding-tablet/.

Richardson, Deidre, "Samsung to bring first folding tablet to market in 2015", Published on: Jun. 11, 2014, 5 pages, Available at: http://www.inferse.com/15463/samsung-bring-first-folding-tablet-market-2015/.

"Fold your tablet, laptop like a map", Published on: May 5, 2014, 2 pages, Available at: http://www.bangladeshchronicle.net/index.php/2014/05/fold-your-tablet-laptop-like-a-map/.

"International Search Report and Written Opinion", Application No. PCT/US2015/055194, Jan. 25, 2016, 11 Pages.

* cited by examiner

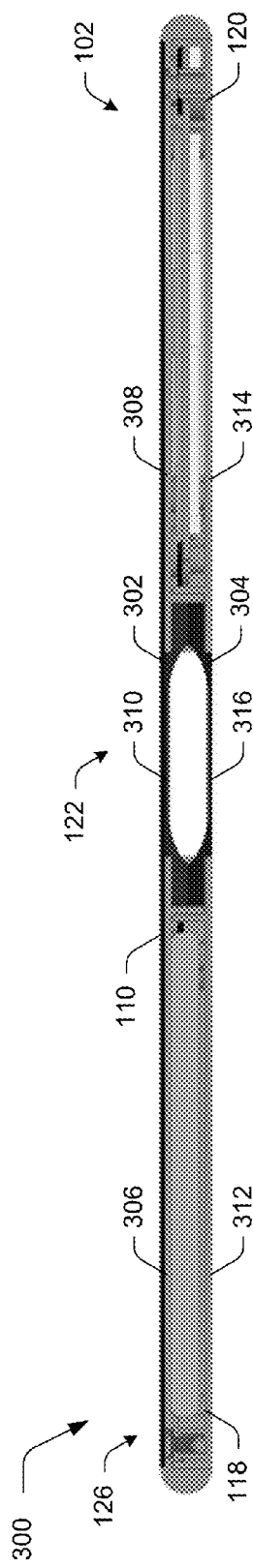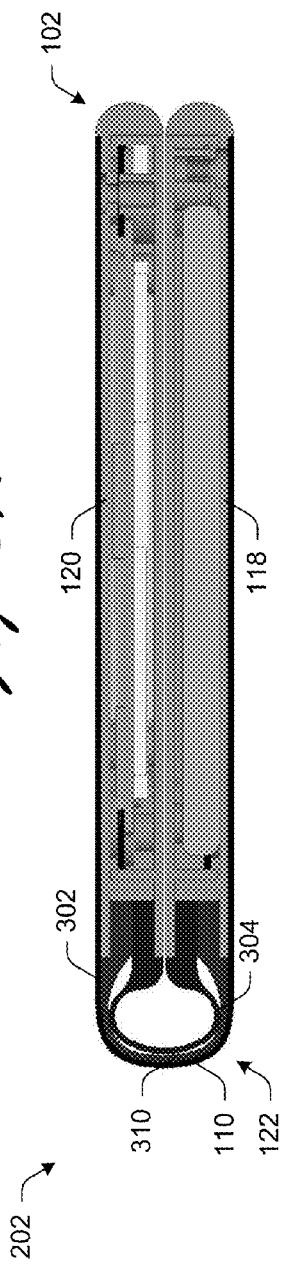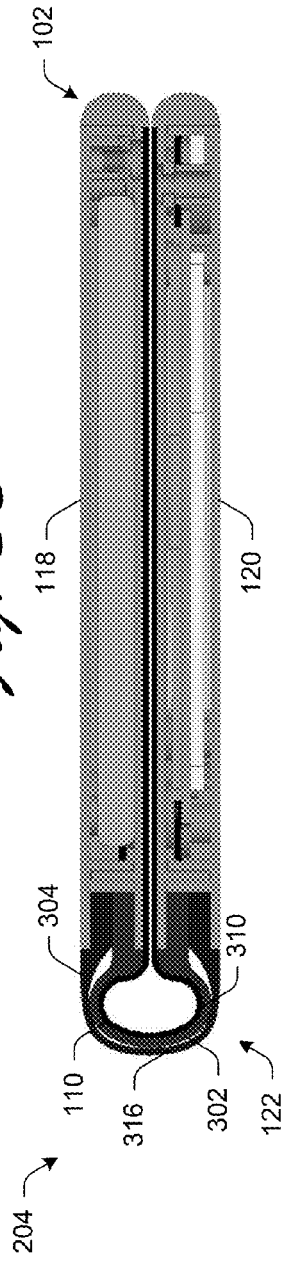

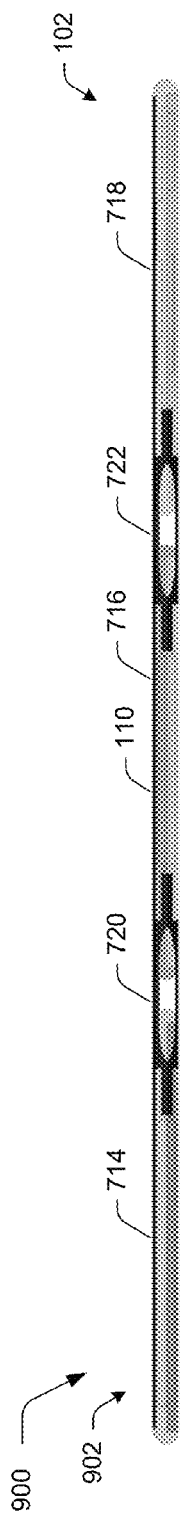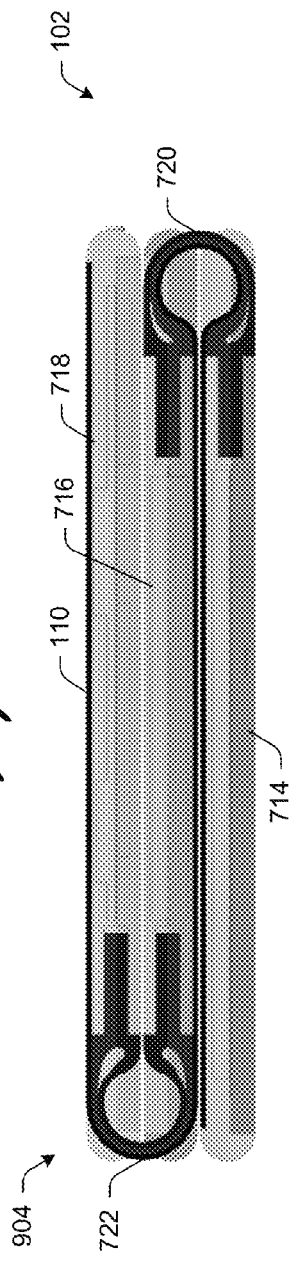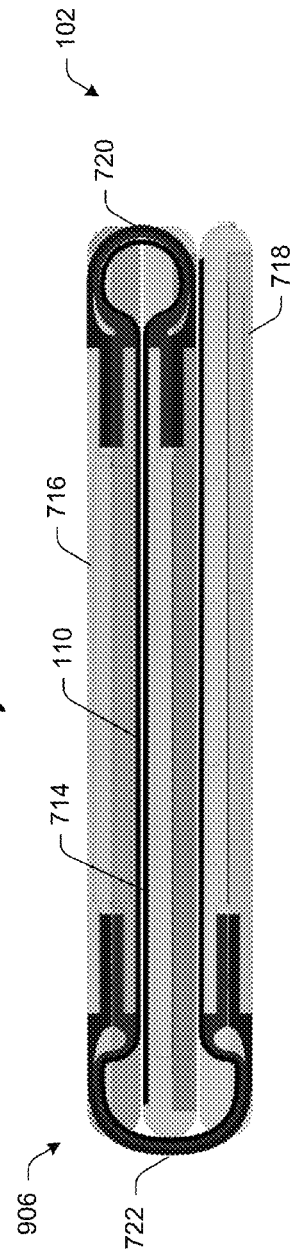

1000

1002

| Screen Ratio | Mini Tablet | Phone | X (mm) | Y (mm) | Display Resolution | DPI |
|---|---|---|---|---|---|---|
| 3:2 | 7.9" | 5.5" | 88.1 | 131.3 | 1440 x 960 | 219 |
|  | 8.5" | 5.9" | 94.4 | 139.6 | 1500 x 1000 | 212 |
|  | 10.8" | 7.5" | 118.7 | 172.2 | 1920 x 1280 | 214 |
|  | 12" | 8.3" | 131.4 | 189.1 | 2160 x 1440 | 216 |
| 3:4 | 7.9" | 5.7" | 84.9 | 140.4 | 1440 x 1080 | 228 |
|  | 8.5" | 6.1" | 90.9 | 149.3 | 1440 x 1080 | 212 |

| Screen Ratio | Tablet | Mini Tablet | Phone | X (mm) | Y (mm) | Display Resolution | DPI |
|---|---|---|---|---|---|---|---|
| 3:2 | 9" | 7.06" | 5.58" | 64.6 | 146.8 | 1680 x 1120 | 224 |
|  | 10" | 7.8" | 6.2" | 71.7 | 160.9 | 1920 x 1280 | 231 |
|  | 12" | 9.4" | 7.4" | 85.8 | 189.1 | 2160 x 1440 | 216 |
|  | 15" | 11.8" | 9.3" | 106.9 | 231.4 | 2880 x 1920 | 231 |
|  | 18" | 14.1" | 11.2" | 128 | 273.7 | 3240 x 2160 | 216 |
| 3:4 | 9" | 7.2" | 5.9" | 62.2 | 157.2 | 1600 x 1200 | 222 |
|  | 10" | 8.0" | 6.6" | 68.9 | 172.4 | 1710 x 1280 | 213 |
|  | 12" | 9.6" | 7.9" | 82.5 | 202.9 | 2160 x 1620 | 225 |
|  | 15" | 12" | 9.8" | 102.8 | 248.6 | 2520 x 1890 | 210 |
|  | 18" | 14.4" | 11.8" | 123.1 | 294.3 | 2880 x 2160 | 200 |

Fig. 10B

MOBILE COMPUTING DEVICE HAVING A FLEXIBLE HINGE STRUCTURE

BACKGROUND

Mobile computing devices may be found in a variety of form factors, such as a tablet, a mobile communications device (e.g., a phone), and so forth. As these form factors are optimized for mobile use, a size of the device becomes a primary consideration in its design and implementation as well as in a choice made by a consumer as to which device to purchase.

A user, for instance, may purchase a mobile phone having a relatively small display device to make phone calls, text, and so on. If a larger display device is desired, a user may also purchase a tablet to answer emails, browser the Internet, and so on. Additionally, form factors have been developed that represent a compromise between these form factors, such as a "phablet" that may have decreased mobility due to an increase in size of a display device. As such, conventional mobile computing device form factors often forced a user to make a choice regarding a form factor that may involve a compromise between these form factors (e.g., a "phablet"), purchase of multiple devices, and so on.

SUMMARY

Techniques are described involving a mobile computing device having a flexible hinge structure. In one or more implementations, a mobile computing device includes a plurality of housings, a display device that is flexible, and a flexible hinge structure. The flexible hinge structure secures the plurality of housings to each other, permits the plurality of housings to rotate about an axis in relation to each other, and supports a continuous viewing area of the display device that extends across the plurality of housings and the flexible hinge structure.

In one or more implementations, a mobile computing device includes a display device that is flexible, a plurality of housings, and a plurality of flexible hinge structures. The plurality of flexible hinge structures secures the plurality of housings, one to another, permits the plurality of housings to rotate about an axis in relation to each other, and supports a continuous viewing area of the display device that extends across the plurality of housings and the plurality of flexible hinge structures thereby forming a continuous surface.

In one or more implementations, a mobile computing device includes a plurality of housings, each of which including a first outer surface, a display device that is flexible and is secured to the first outer surfaces of the plurality of housings, and a flexible hinge structure. The flexible hinge structure secures the plurality of housings to each other, permits the plurality of housings to rotate about an axis in relation to each other, and includes a first flexible member that has a first outer surface to which the display device is secured.

In one or more implementations, a device includes a plurality of planar surfaces and a flexible hinge structure joining the plurality of planar surfaces and configured to permit rotation about an axis, the flexible hinge structure including a first member having an outer surface that is configured to be secured to a display device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

FIGS. 3A, 3B, and 3C depict an example implementation showing cross sections of the configurations of FIGS. 1, 2A, and 2B and an example of the flexible hinge structure in greater detail.

FIGS. 9A, 9B, and 9C depict an example implementation showing cross sections of configurations in which the mobile computing device of FIGS. 7A and 7B may be placed through use of a plurality of flexible hinge structures.

FIGS. 10A and 10B depict an example implementation describing aspect ratios and sizes that may be employed by the mobile computing device of FIGS. 1, 7A and 7B.

DETAILED DESCRIPTION

Overview

The size of a display device has been found to be a major consideration by consumers regarding a choice of which mobile computing device to buy, whether to purchase multiple mobile computing devices, and so on. For example, a user may be forced to balance portability of a mobile computing device having a relatively small display device (e.g., a mobile phone) with increased viewability afforded by larger display devices included on relatively large mobile computing devices, e.g., tablets.

A mobile computing device having a flexible hinge structure is described. In one or more implementations, a mobile computing device includes a plurality of housings, e.g., two housings, three housings, and so on. The housings are secured to each other using a flexible hinge structure that is configured to support a continuous surface, across which, a display device may be attached that is flexible. For example, the display device may be configured as an OLED and secured to outer surfaces of the housings as well as the flexible hinge structure, itself.

In this way, the housings of the mobile computing device may support a variety of different usage scenarios through arrangement of the housings in relation to each other, e.g., by folding. For example, a "tablet" configuration may be supported in which each of the housings are "laid flat" such that an entirety of the display device is viewable by a user. In a "phone" configuration, one of the housings may be stacked behind another one of the housings such that the mobile computing device may be easily grasped using a single hand yet still provide a portion of the display device that is viewable by a user. In a "closed" configuration, the display device may be positioned internally in the stacked configuration and thus may be used to protect the display device when not in use. A variety of other configurations are also described, such as a "mini-tablet" configuration, as well as biasing mechanisms that may be employed to bias the mobile computing device to remain in a desired configuration, further discussion of which may be found in relation to the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures.

Example Environment

Figure 1:
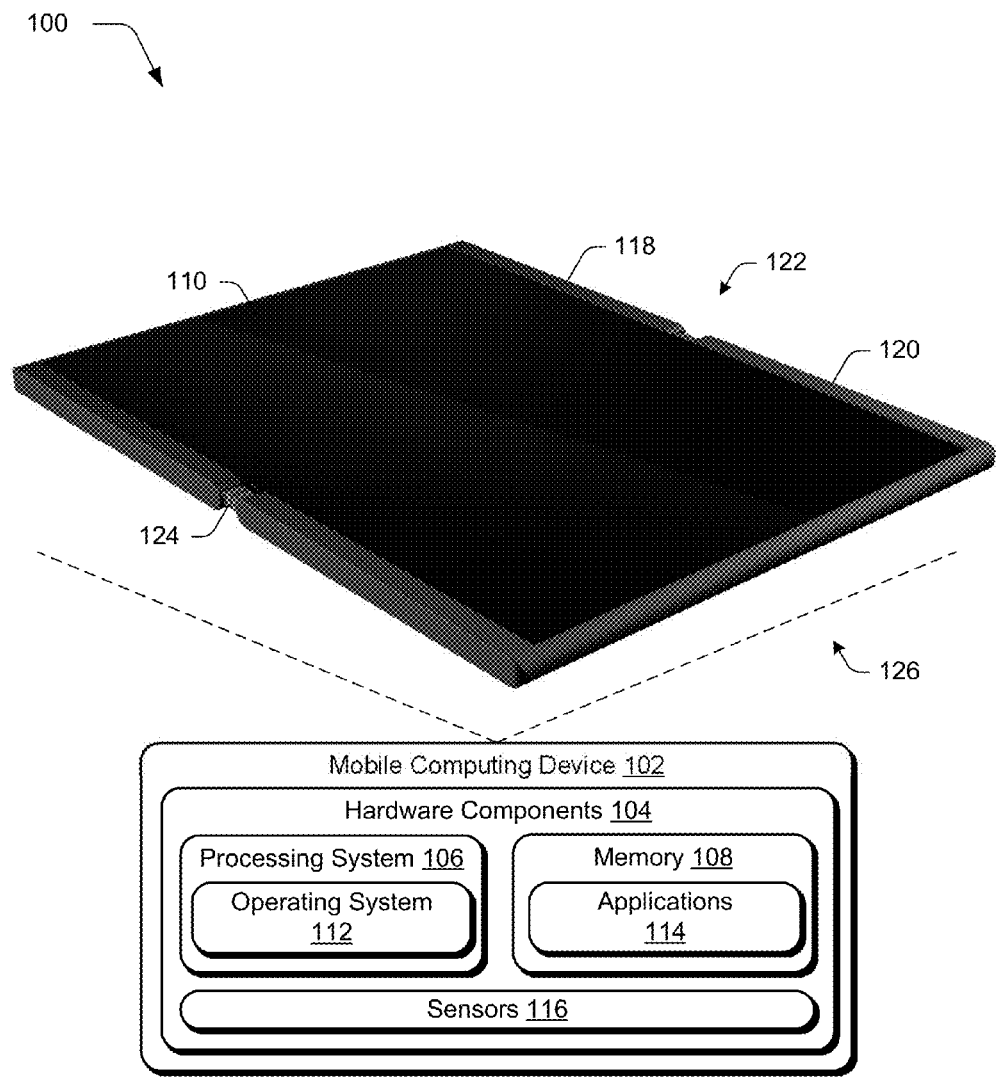
FIG. 1 is an illustration of an environment in an example implementation that is operable to employ a mobile computing device having a flexible hinge structure.

FIG. 1 is an illustration of an environment 100 in an example implementation that is operable to employ support the flexible hinge structure techniques described herein. The illustrated environment 100 includes a mobile computing device 102 having one or more hardware components 104, examples of which include a processing system 106 and a computer-readable storage medium that is illustrated as a memory 108, and a display device 110 although other components are also contemplated as further described below.

The mobile computing device 102 may be configured in a variety of ways. For example, the mobile computing device may be configured a mobile phone, tablet, portable gaming device, music player, and so forth. Thus, the mobile computing device 102 may range from full resource devices with substantial memory and processor resources (e.g., tablet computers, phones, and laptops) to a low-resource device with limited memory and/or processing resources (e.g., music players). Although a mobile computing device is described, other configurations are also contemplated, such as desktop configurations, televisions, and so forth.

The mobile computing device 102 is further illustrated as including an operating system 112, although other embodiments are also contemplated in which an operating system is not employed. The operating system 112 is configured to abstract underlying functionality of the mobile computing device 102 to applications 114 that are executable on the mobile computing device 102. For example, the operating system 112 may abstract the processing system 106, memory 108, network, and/or display device 110 functionality of the mobile computing device 102 such that the applications 114 may be written without knowing "how" this underlying functionality is implemented. The applications 114, for instance, may provide data to the operating system 112 to be rendered and displayed by the display device 110 without understanding how this rendering will be performed. The operating system 112 may also represent a variety of other functionality, such as to manage a file system and user interface that is navigable by a user of the mobile computing device 102.

The mobile computing device 102 may support a variety of different interactions. For example, the computing device 102 may include one or more hardware devices that are manipulable by a user to interact with the device, such as a keyboard, cursor control device (e.g., mouse), and so on. The mobile computing device 102 may also support gestures, which may be detected in a variety of ways. The mobile computing device 102, for instance, may support touch gestures that are detected using touchscreen functionality of the display device 110 of the computing device 102 using one or more sensors 116. The sensors 116, for instance, may be configured as capacitive, resistive, acoustic, light (e.g., sensor in a pixel), and so on that are configured to detect proximity of an object.

The mobile computing device 102 is illustrated as including a plurality of housings, examples of which include first and second housings 118, 120. The first and second housings 118, 120 are secured to each other using a flexible hinge structure 122. The first and second housings 118, 120 along with the flexible hinge structure 122 form a continuous surface in this example that is disposed generally along a single plane. The display device 110 is secured to the continuous surface such that a viewing area of the display device 110 extends across the outer surfaces of the first and second housings 118, 120 as well as an outer surface of the flexible hinge 122.

The flexible hinge structure 122 is configured to support rotational movement along an axis that is perpendicular, generally, to a longitudinal axis of the hinge. This may be utilized to position the first and second housings 118, 120 to support a variety of different configurations. Additionally, the mobile computing device 102 may include a biasing mechanism 124 that may be used to bias the first and second housings to remain in a desired configuration.

As illustrated in FIG. 1, for instance, a "tablet" configuration 126 is shown in which the first and second housings 118, 120 are disposed next to each other along a single plane, such as when placed on a surface such as a desk, table, and so forth. This causes the outer surfaces of the first and second housings 118, 120 as well as the flexible hinge structure 122 to form a continuous and generally flat surface and as such, supports the display device 110 in a similar arrangement. Thus, in the tablet configuration 126 an entirety of a display area of the display device 110 is viewable by a user. Other configurations are also supported, examples of which are described in the following and shown in corresponding figures.

Figure 2A:
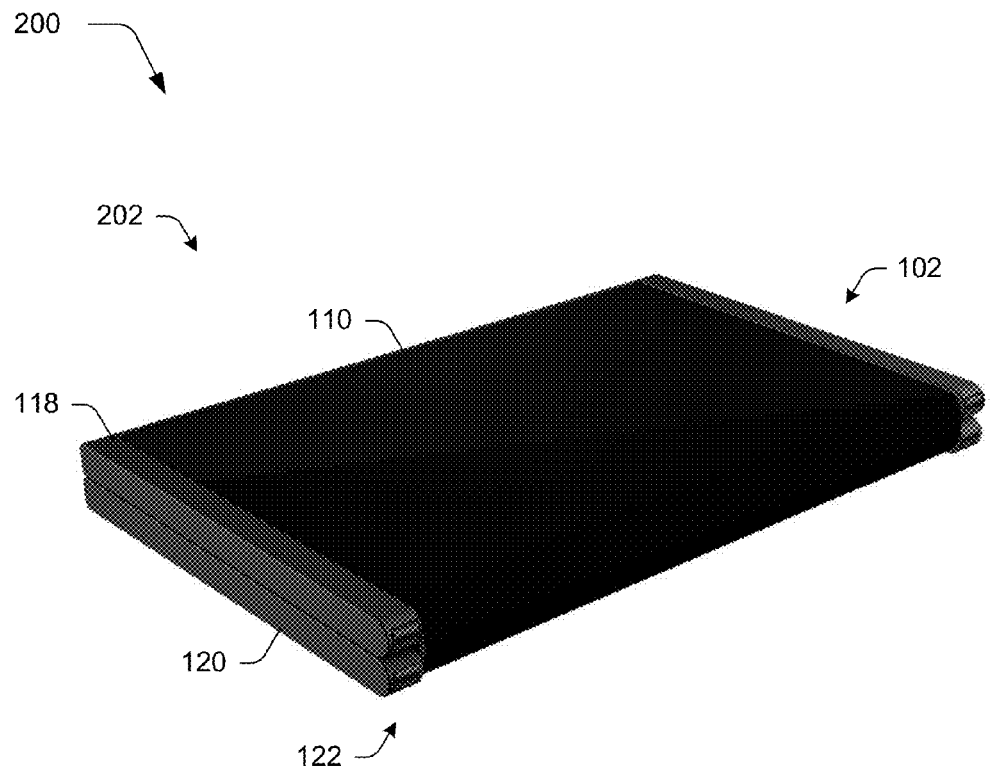
FIGS. 2A and 2B depict an example implementation in which additional configurations that are supported through movement of the plurality of housings using the flexible hinge structure are shown.
Figure 2B:
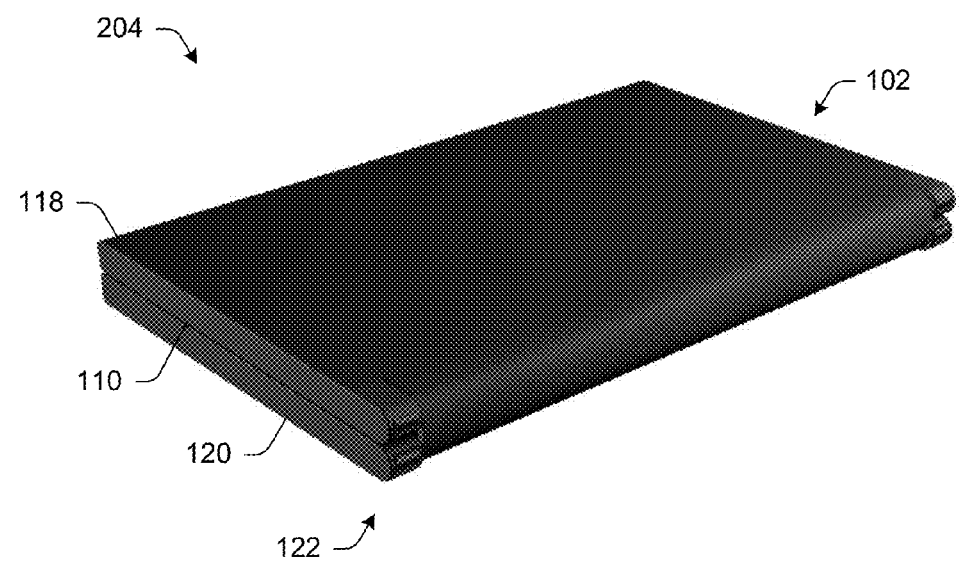

FIGS. 2A and 2B depict an example implementation 200 in which additional configurations that are supported through movement of the plurality of housings using the flexible hinge structure are shown. Open and closed stacked configurations 202, 204 are illustrated in FIGS. 2A and 2B, respectively. In the open stacked configuration 202, the second housing 120 is rotated underneath the first housing 118 using the flexible hinge structure 122 such that the housing are stacked, one atop another. The open stacked configuration 202 may also referred to as a "phone" configuration because the stacked configuration mimics a form factor of a phone and permits viewing of a portion of the display device 110 by a user. Thus, in the open stacked configuration 202 both the first and second housings 118, 120 of the mobile computing device 102 may be grasped by a single hand of a user and the other hand may be utilized to interact with touchscreen functionality of the display device 110, the user may place a phone call by holding the mobile computing device proximal to the user's head, and so forth.

In the closed stacked configuration 204, a stacked arrangement of the first and second housings 118, 120 is also formed. In this instance, however, the second housing 120 is rotated and positioned over the first housing 118 such that the display device 110 is disposed between the first and second housings 118, 120. In this way, the display device 110 may be protected when the mobile computing device 102 is not in use, such as when placed within a backpack, a user's pocket, and so forth.

FIGS. 3A, 3B, and 3C depict an example implementation 300 showing cross sections of the configurations of FIGS. 1, 2A, and 2B and an example of the flexible hinge structure in greater detail. This example implementation shows a cross section of the tablet configuration 126, open stacked configuration 202, and closed stacked configuration 204 previously described and shown generally as FIGS. 3A, 3B, and 3C, respectively. In the tablet configuration 126, the first and second housings 118, 120 are disposed in a single plane as previously described. A variety of different hardware components may be disposed within the housings, such as a battery within the first housing 118 and a processing system 106 and memory 108 as well as other hardware components 104 of FIG. 1 in the second housing 120.

The flexible hinge structure 122 in this example includes first and second members 302, 304, which in this instance have an arced shaped to support a minimum bend radius as further described below. The flexible hinge structure 122 may be formed from a variety of materials, such as materials that mimic rubber, a fabric, and so forth. The first member 302 is configured to form a continuous surface with the first and second housings 118, 120 when in the tablet configuration 126. For example, the first and second housings 118, 120 may each include first outer surfaces 306, 308, respectively, to which the display device 110 is secured.

The first member 302 of the flexible hinge assembly 122 in this example is configured to "fill in the gap" by continuing these first outer surfaces 306, 308 across a first outer surface 310 of the first member 302. In this way, the first outer surfaces 306, 308 of the first and second housings 118, 120 as well as the first outer surface 310 of the first member 302 may form a continuous surface, to which, the display device 110 is secured. Thus, a user may view an entirety of an available display area of the display device 110 in this example without viewing seams or borders as would be required using separate display devices, although that implementation is also contemplated without departing from the spirit and scope thereof.

The second member 304 is also configured to form a continuous surface with the first and second housings 118, 120 when in the tablet configuration 126 at an opposing side to the display device 110. For example, the first and second housings 118, 120 may each include second outer surfaces 312, 314, respectively, that are disposed on an opposing side of the housing to which the display device 110 is secured. The second member 304 of the flexible hinge assembly 122 is also configured to "fill in the gap" by continuing these second outer surfaces 312, 314 across a second outer surface 316 of the second member 304. Thus, as before the second outer surfaces 312, 314 of the first and second housings 118, 120 as well as the second outer surface 316 of the second member 304 may form a continuous surface along a rear portion of the computing device 102. In this way, the flexible hinge structure 122 may give a look and feel of a continuous slate even though the mobile computing device 102 may be folded into a variety of configurations as further described below.

In the open stacked configuration 202, the display device 110 is exposed externally as the display device 110 follows a curvature of the first surface 310 of the first member 302 of the flexible hinge structure 302. The second member 316 is disposed within the curvature of the first member 302 and thus may provide support to the first member and consequently the display device 110. For instance, the display device 110 may include components that are not configured to flex beyond a minimum bend radius without breaking. Accordingly, the first member 302, along with support from the second member 304, may be configured such that a bend radius of the flexible hinge structure 122 does not exceed a minimum operational bend radius of the display device 110 when in the open configuration 202.

Likewise, the flexible hinge structure 122 may also support a minimum bend radius when in the closed stacked configuration 204. For example, the first member 302 may be configured to have an arced shape as shown in the tablet configuration 202. When folded, the arched shaped of the first member 302 may cause the first member 302 to bend outward, thereby supporting a minimum bend radius internal to the first member 302, which is also disposed internal to the second member 304 in this configuration. Thus, in this example the second member 304 may also act to protect the first member 302 and thus the minimum bend radius, such as to protect the first member 302 from inadvertent flexing from an outside force.

As shown, the mobile computing device 102 may assume a variety of different configurations through positioning of the first and second housings 118, 120 in relation to each other using rotation supported by the flexible hinge structure 122. The mobile computing device 102 may also employ a biasing mechanism 124 to promote stability of the housings in relation to each other in desired configurations, further discussion of that may be found in relation to the following description and is shown in corresponding figures.

Figure 4:
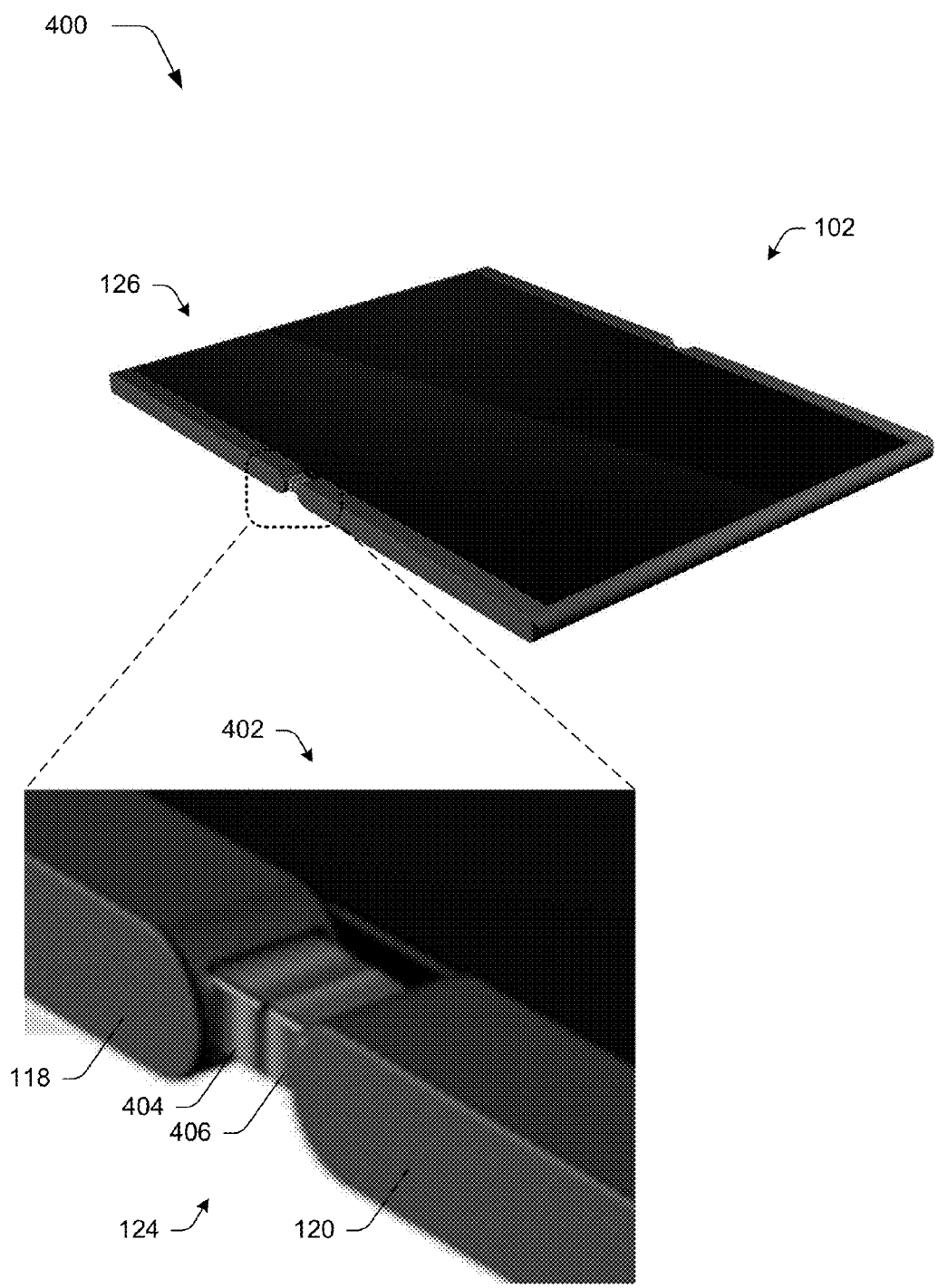
FIG. 4 depicts an example implementation in which the mobile computing device of FIG. 1 assumes a tablet configuration and employs a biasing mechanism to promote stability of the first and second housings in relation to each other to thereby promote stability while in this configuration.

FIG. 4 depicts an example implementation 400 in which the mobile computing device 102 assumes a tablet configuration 126 and employs a biasing mechanism 124 to promote stability of the first and second housings 118, 120 in relation to each other to thereby promote stability while in this configuration. An expanded view 402 of the biasing mechanism 124 is shown. In this example, the biasing mechanism 124 includes first and second appendages 404, 406 that are configured to resist rotation of the first and second housings 118, 120 in relation to each other.

Figure 6A:
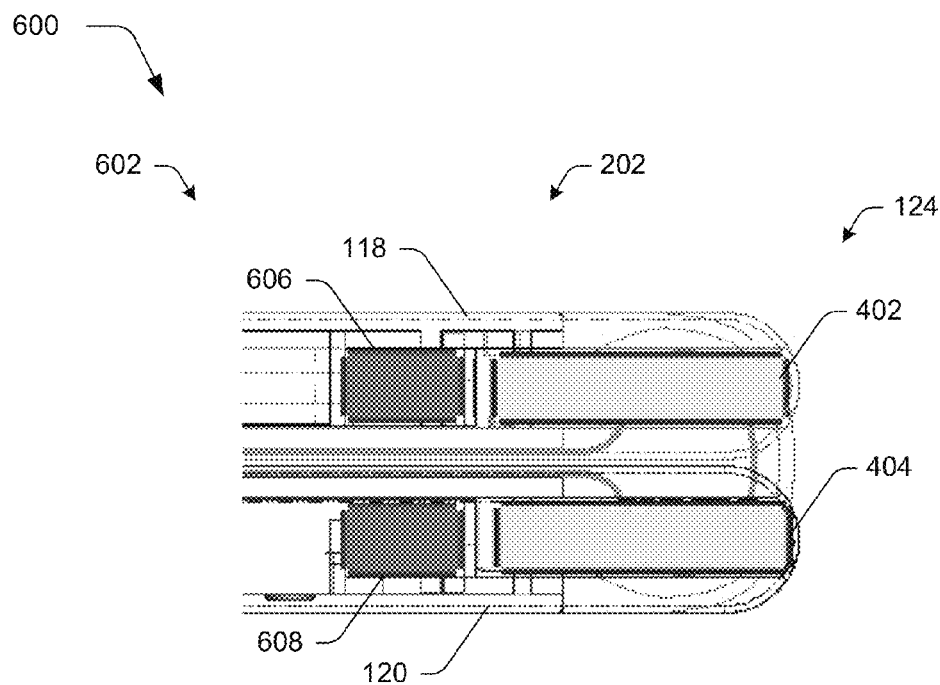
FIGS. 6A and 6B depict an example implementation showing cross sections of the biasing mechanism of FIG. 5 in an open stacked configuration and a tablet configuration.
Figure 6B:
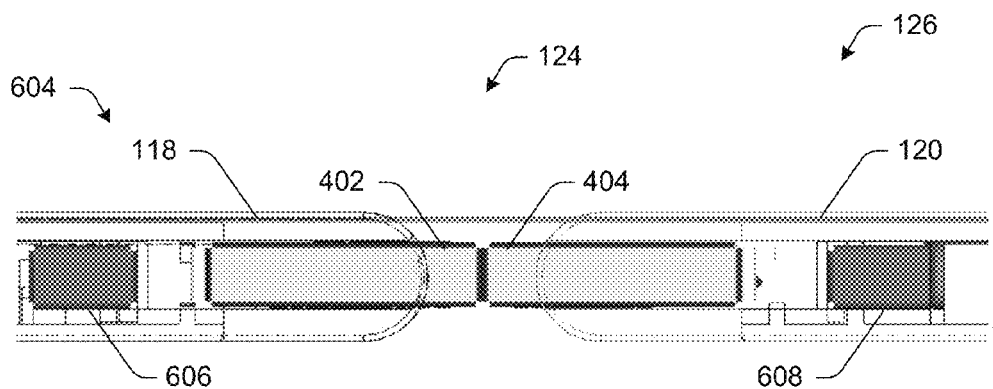

The first and second housings 118, 120, for instance, may include respective first and second appendages 404, 406 that are configured to extend from their respective housings and engage each other. This may be performed using a spring assembly, motorized assembly (e.g., operated through use of an input such as by pressing a button), magnetic assembly as shown in FIGS. 6A and 6B, and so on. Once extended and engaged, the first and second appendages 404, 406 bias the first and second housings 118, 120 to remain in a coplanar relationship, which is the tablet configuration 126 in this example. The first and second appendages 404, 406 may also be retracted to support positioning in other configurations, an example of which is further described below and is shown in a corresponding figure.

Figure 5:
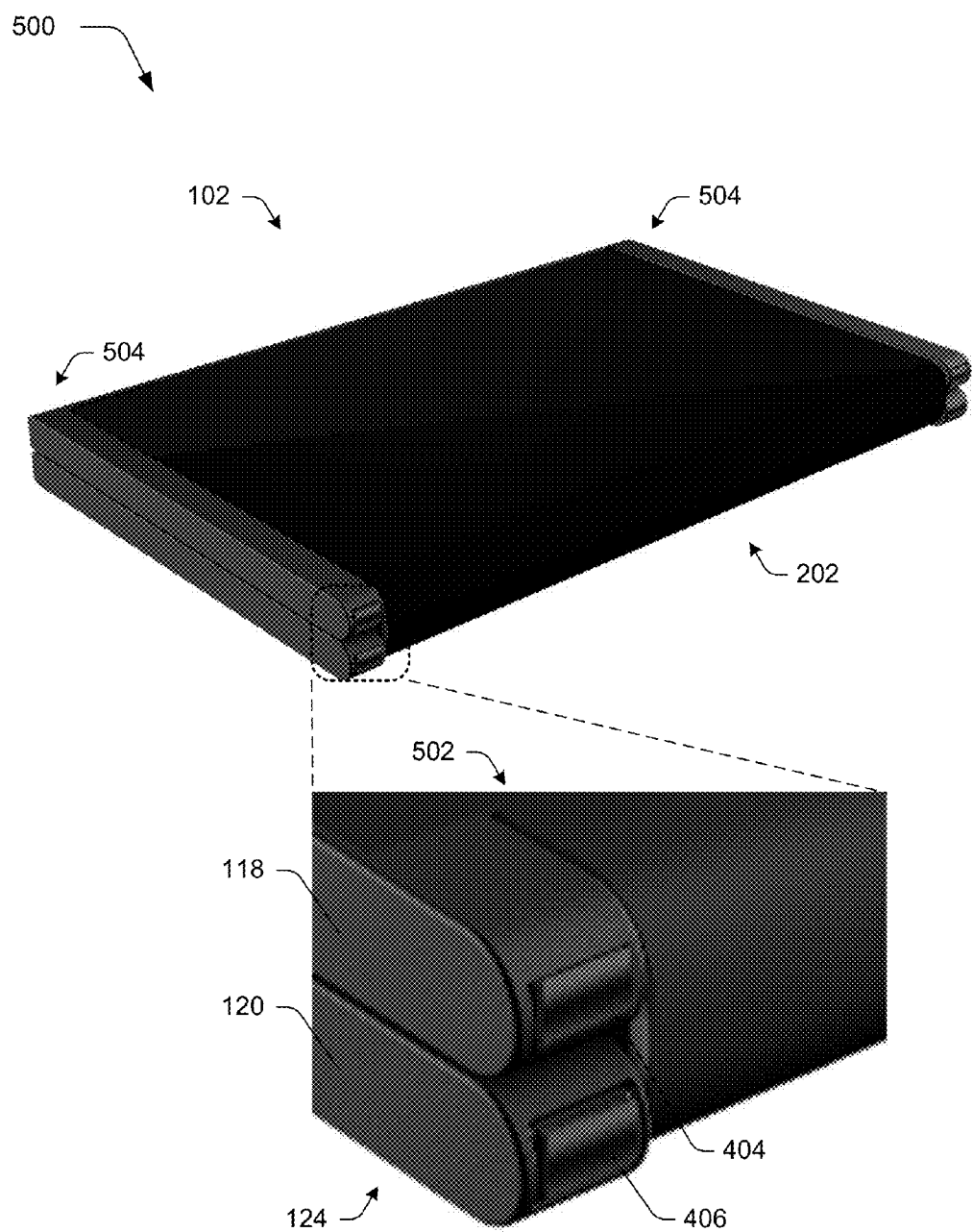
FIG. 5 depicts an example implementation in which the mobile computing device of FIG. 1 assumes an open configuration in which appendages of a biasing mechanism of FIG. 4 are retracted and another biasing mechanism is employed to promote stability in this configuration.

FIG. 5 depicts an example implementation 500 in which the mobile computing device 102 assumes an open configuration 202 in which the appendages 404, 406 of the biasing mechanism 124 of FIG. 4 are retracted and another biasing mechanism is employed to promote this configuration. This example also includes an expanded view 502 of the biasing mechanism 124 of FIG. 5. In this example, however, the first and second housings 118, 120 have assumed an open stacked configuration 202 as previously described in relation to FIG. 2A. Accordingly, the biasing mechanism 124 is configured to retract the first and second appendages 404, 406 within a cavity of respective first and second housings 118, 120. Thus, the first and second appendages 404, 406 may be taken "out of the way" and thus reduce unwanted interference.

The mobile computing device 102 also includes additional biasing mechanisms 504 to promote stability in this configuration. For example, the first and second housings 118, 120 may include magnets that are configured to cause the housings to be secured to each other. Therefore, the first and second housings 118, 120 may have increased stability when in the open configuration. It should be readily apparent that the biasing mechanisms 504 may also be employed to promote stability in the closed stack configuration previously described.

FIGS. 6A and 6B depict an example implementation showing cross sections 602, 604 of the biasing mechanism 124 in an open stacked configuration 202 and a tablet configuration 126, respectively. In the first cross section 602, an open stacked configuration 202 is shown in which the first and second appendages 402, 404 are retracted within respective cavities of the first and second housings 118, 120. This may be performed in a variety of ways, such as through a motorized connection, spring bias force, and so on. In the illustrated example, the first and second appendages 402, 404 include magnets. The biasing mechanism 124 also includes magnets 606, 608 disposed within the first and second housings 118, 120 that are configured to retract the first and second appendages 402, 404 and thus "drawn in" the appendages when in the open stacked configuration 126.

In the second cross section 604, however, a tablet configuration 126 is shown in which the first and second housings 118, 120 are in a coplanar relationship to each other. Magnetism of the first and second appendages 402, 404 in this example toward each other is configured to overcome magnetic attraction of the first and second appendages 402, 404 to respective magnets 606, 608 disposed within the first and second housings 118, 120. As such, the first and second appendages 402, 404 are configured to automatically extend and engage each other, thereby promoting stability of the first and second housings 118, 120 in the coplanar relationship.

In this way, a user may quickly transition the housings of the mobile computing device 102 between modes by manually grasping and moving the housings in relation to each other and yet still be provided with a stable configuration once positioned as desired. Although a mobile computing device 102 having two housing is described above, the mobile computing device 102 may also employ a plurality of flexible hinge structures to support use of three or more housings, an example of which is described as follows and is shown in a corresponding figure.

Figure 7A:
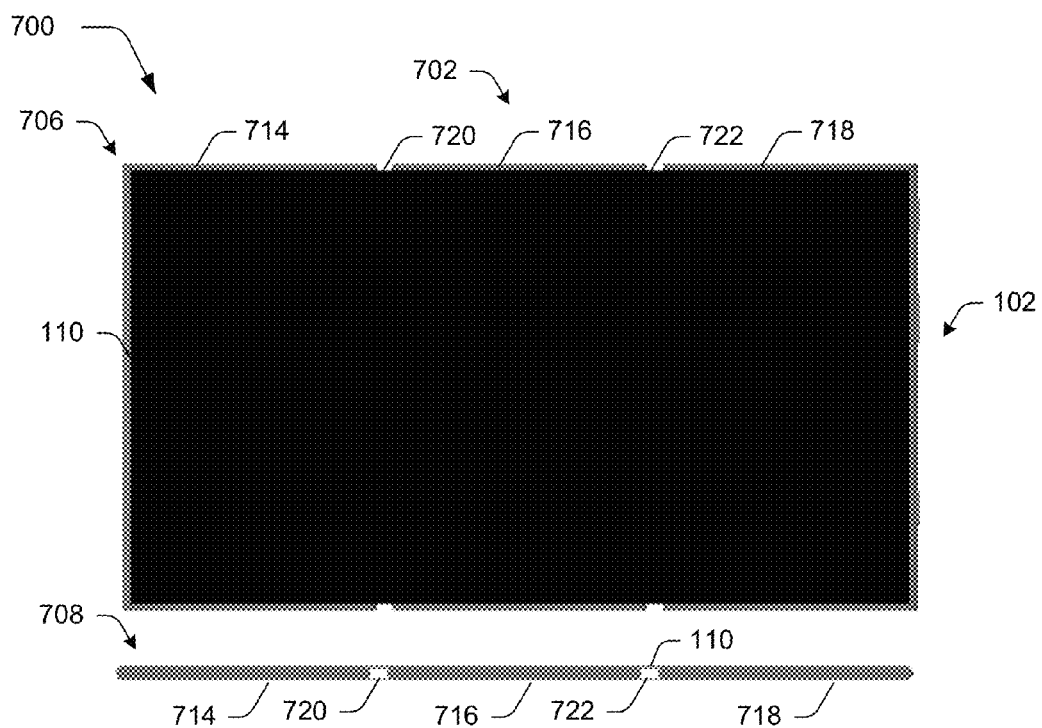
FIGS. 7A and 7B depict an example implementation in which additional configurations are shown that are supported through movement of three housings using a plurality of flexible hinge structures.
Figure 7B:
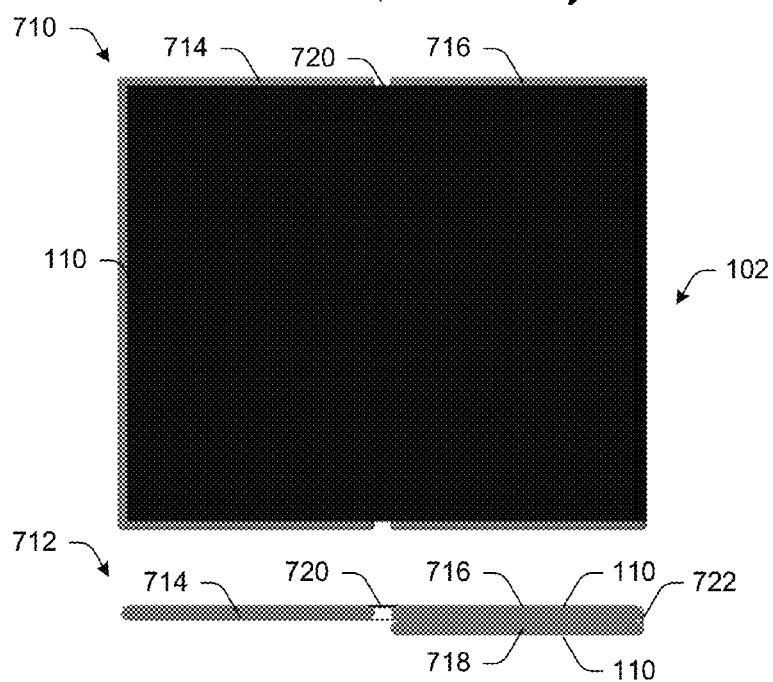

FIGS. 7A and 7B depict an example implementation 700 in which additional configurations are shown that are supported through movement of three housings using a plurality of flexible hinge structures. This example implementation 700 includes a tablet configuration 702 and a mini-tablet configuration 704. The tablet configuration 702 is illustrated using a top 706 and side 708 view and the mini-tablet configuration 704 is also illustrated using a top 710 and side 712 view.

The mobile computing device 102 in this example includes first, second, and third housings 714, 716, 718. The first and second housings 714, 716 are secured to each other using a first flexible hinge structure 720 and the second and third housings 716, 718 are secured to each other using a second flexible hinge structure 722. This may be utilized to support a variety of different configurations as previously described.

In the tablet configuration 702, for instance, the first, second, and third housings 714, 716, 718 form a coplanar relationship. Through use of the first and second flexible hinge structures 720, 722, a continuous surface may be created that extends across an outer surface of the first, second, and third housings 714, 716, 718 as well as the first and second flexible hinge structures 720, 722, e.g., through use of a first member as described in relation to FIGS. 3A, 3B, and 3C. In this way, a continuous viewing area may be supported by the display device 110 across these structures for viewing by a user.

In the mini-tablet configuration 702, the first and second housings 714, 716 along with the first flexible hinge structure 720 are arranged in a coplanar relationship as described in relation to FIG. 1. The second and third housings 716, 718, however, form a stacked configuration in which the third housing 718 is disposed beneath the second housing 716 through use of the second flexible hinge structure 722. Thus, in this example mini-tablet configuration 704 portions of the display device 110 disposed on the first and second housings 714, 716 as well as the first flexible hinge structure 720 are viewable by a user but the portion of the display device 110 disposed on the third housing 718 is not. Thus, the mini-tablet configuration 702 may support increased portability over the tablet configuration 702 yet still provide an expanded viewing area as opposed to a phone configuration, an example of which is described as follows and shown in a corresponding figure.

Figure 8A:
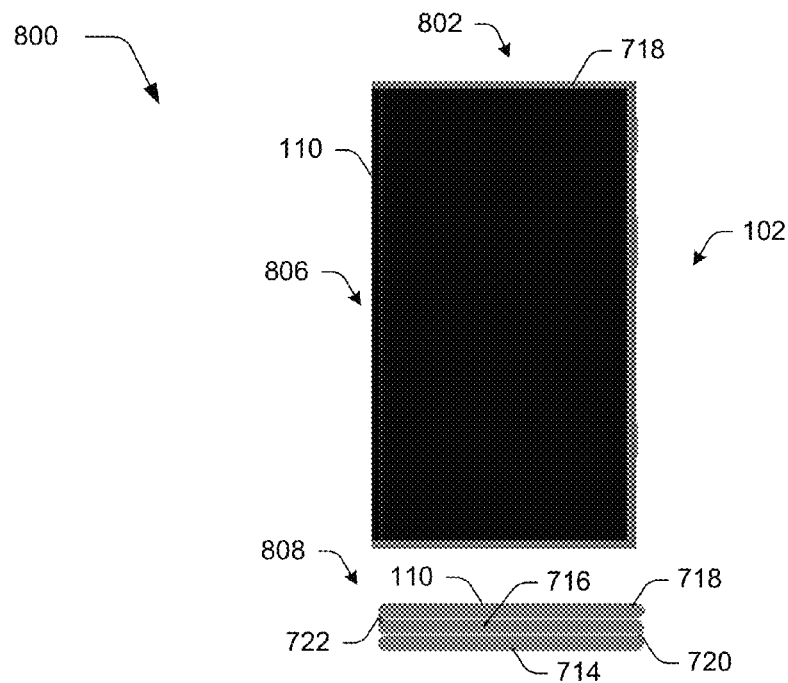
FIGS. 8A and 8B depict an example implementation in which further configurations are shown that are supported through movement of three housings using a plurality of flexible hinge structures.
Figure 8B:
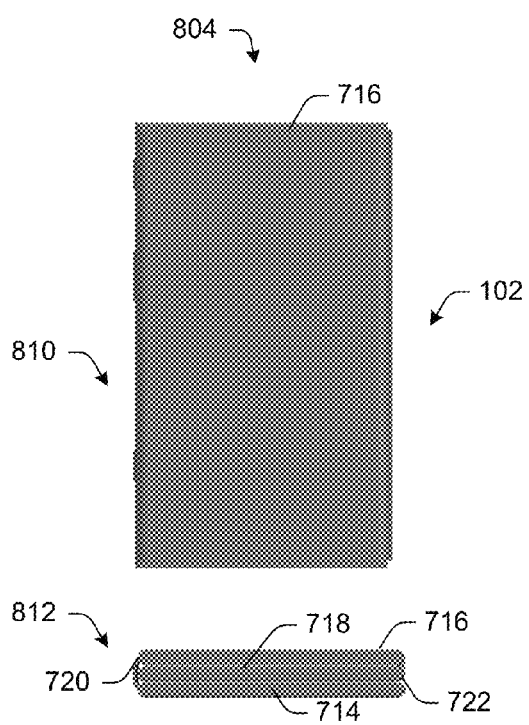

FIGS. 8A and 8B depict an example implementation 800 in which further configurations are shown that are supported through movement of three housings using a plurality of flexible hinge structures. This example implementation 800 includes a phone configuration 802 (e.g., open stacked configuration) and a closed stacked configuration 804. The phone configuration 802 is illustrated using a top 806 and side 808 view and the closed stacked configuration 804 is also illustrated using a top 810 and side 812 view.

In the phone configuration 802, the third housing 718 is stacked upon the second housing 716 which is stacked upon the first housing 714 through use of the first and second flexible hinge structures 720, 722. Thus, in this example a form factor of the mobile computing device 102 mimics a phone and includes a portion of the display device 110 on the third housing 718 that is viewable by a user. Other examples are also contemplated, such as to stack the first housing 714 over the second housing 716, which is stacked over the third housing 718.

In the closed stacked configuration 804, the third housing 718 is disposed between the first and second housings 714, 716 so that the display device 110 is not viewable by a user and thus is protected from damage. As illustrated, the first flexible hinge structure 720 may bend around the third housing 718 that is disposed between the first and second housings 714, 716.

FIGS. 9A, 9B, and 9C depict an example implementation 900 showing cross sections of configuration in which the mobile computing device of FIGS. 7A and 7B may be placed through use of a plurality of flexible hinge structures. This example implementation includes a tablet configuration 902, an open stacked configuration 904, and a closed stacked configuration 906. In the tablet configuration 902 as before, the first, second, and third housings 714, 716, 718 as well as the first and second flexible hinge structures 720, 722 form a coplanar relationship. The first and second flexible hinge structures 720, 722 may be formed in a variety of ways, such as through use of first and second members as described previously in relation to FIGS. 3A, 3B, and 3C.

In the open stacked configuration 904 (i.e., phone configuration), a portion of the display device 110 disposed on the third housing 718 is viewable by a user. The third housing 718 is stacked over the second housing 716 which is stacked over the first housing 714 by bending of the first and second flexible hinge structures 720, 722 as previously described.

In the closed stacked configuration 906, the first housing 714 in this example is disposed between the second and third housings 716, 718 with the display device 110 positioned internally in this configuration. Thus, as previously described the plurality of housings of the mobile computing device 102 may be positioned in a variety of ways to support a variety of different arrangements.

FIGS. 10A and 10B depict an example implementation 1000 describing aspect ratios and sizes that may be employed by the mobile computing device 102. In table 1002, a two housing arrangement is described and corresponding configurations that include phone (i.e., the open stacked configuration 202) and mini tablet (i.e., the table configuration 126). In table 1004, a three housing arrangement is described including a tablet (e.g., tablet configuration 702), phablet (e.g., mini-tablet configuration 704), and phone configuration (e.g., phone configuration 802) are described.

Figure 11A:
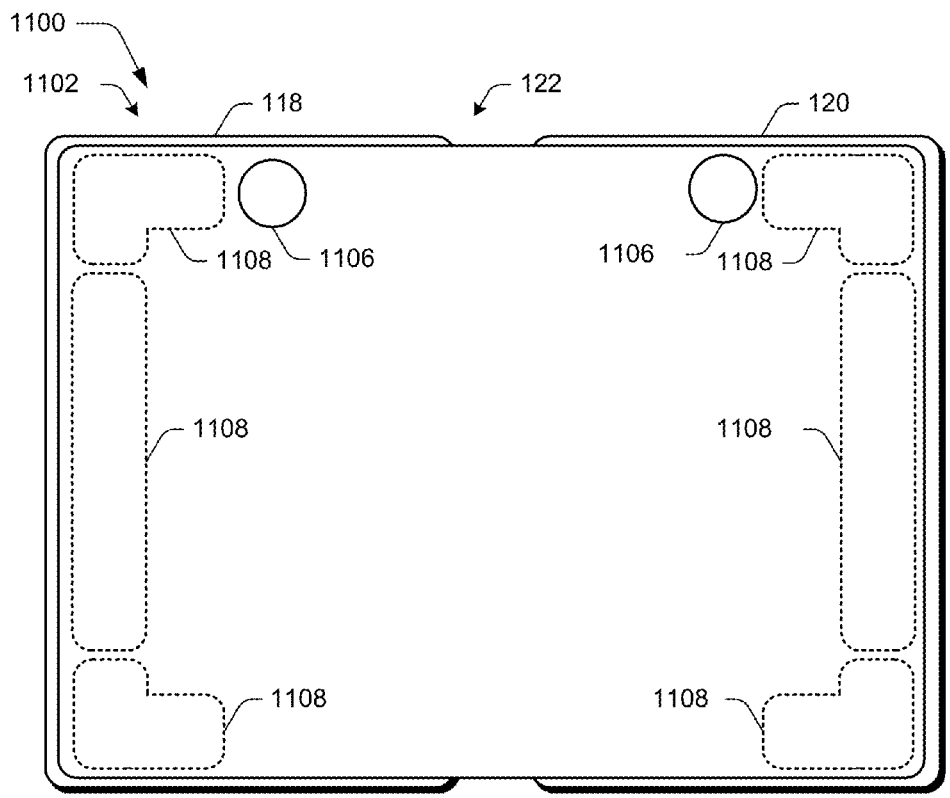
FIGS. 11A and 11B depict an example implementation in which example positions of antennas are shown for different arrangements of the mobile computing device.
Figure 11B:
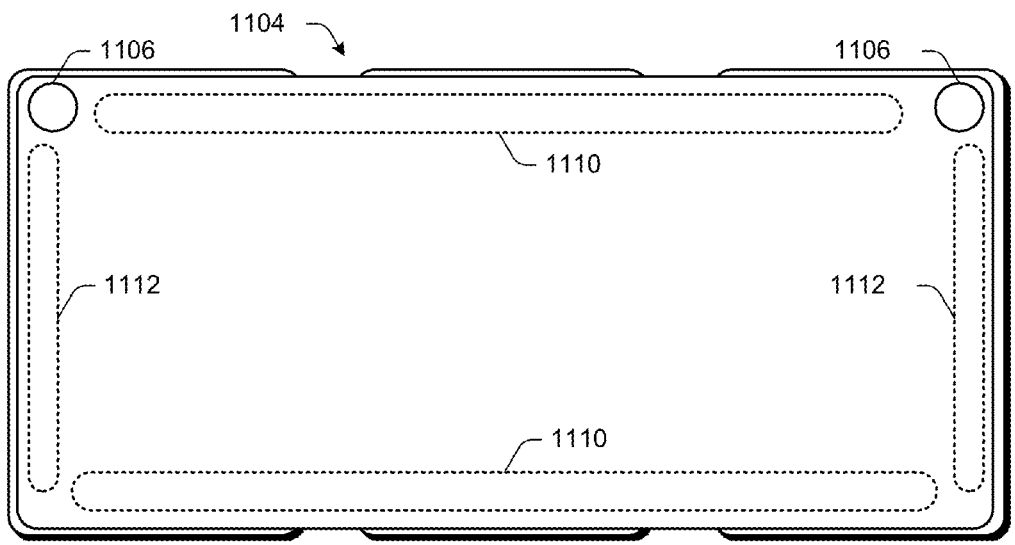

FIGS. 11A and 11B depict an example implementation 1100 in which example positions of antennas are shown for different arrangements of the mobile computing device 102. In a first example 1102, examples of camera positions 1106 are shown as may be disposed within the first and/or second housings 118, 120.

Keepouts are also illustrated using phantom lines. The keepouts generally have non-interfering and/or RF transparent materials (e.g., polymers/plastics). This means that interfering material such as metal may be "kept out" of these areas. Even using interfering material in other areas may affect performance of an antenna suite and therefore placement of interfering material is a factor that may be taken into account for antenna placement. In addition, the antenna placement consumes real estate of the device that may otherwise be used for connectors, interfaces, buttons, speakers, and/or other components. Thus, the amount of area and locations that are taken up by the antennas and that are available for other components may be another factor used to select antenna placements. Hand positions commonly used by users of the device may also be taken into account. In practice, trade-offs between the example considerations enumerated above as well as other considerations may be made to select a suitable arrangement that enables placement of a plurality of antennas and/or provides acceptable performance given the various different design considerations.

In the illustrated first example 1102, keepout areas 1108 are shown that are symmetrically distributed such that antennas disposed in these areas may function when the mobile computing device 102 assumed a stacked configuration. The keepout areas 1108, for instance, may be disposed using a nine millimeter bezel at the top and/or bottom and using an eight millimeter bezel on the left and/or right portions. The keepout areas 1108 may be used to place a variety of different antennas, such as cellular antennas (e.g., LTE), MIMO antennas, Wi-Fi antennas, GPS antennas, and so on.

In the second example 1104, example camera placement 1106 and keepout areas are also illustrated. As above, the keepout areas may be utilized to include antennas. Keepout areas 1110, for instance, may be utilized to include antennas for cellular and MIMO antennas whereas keepout areas 1112 may be used for Wi-Fi and GPS. A variety of other examples are also contemplated without departing from the spirit and scope thereof. In the above examples, a plurality of housings are connected to each other to permit rotational movement through folding. Other examples are also contemplated, an example of which is described as follows and shown in a corresponding figure.

Figure 12A:
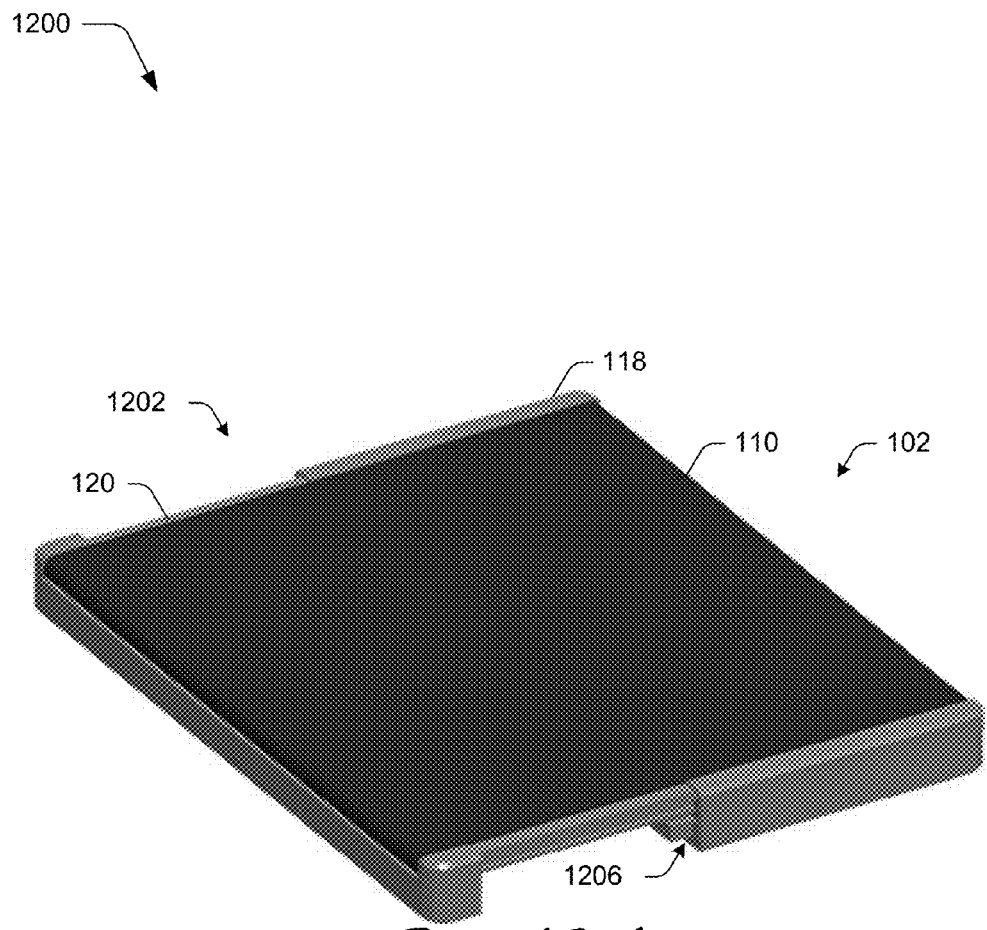
FIGS. 12A, 12B, 13A, and 13B depict example implementations in which the mobile computing device of FIG. 1 includes first and second housings that are connected using a sliding arrangement.
Figure 12B:
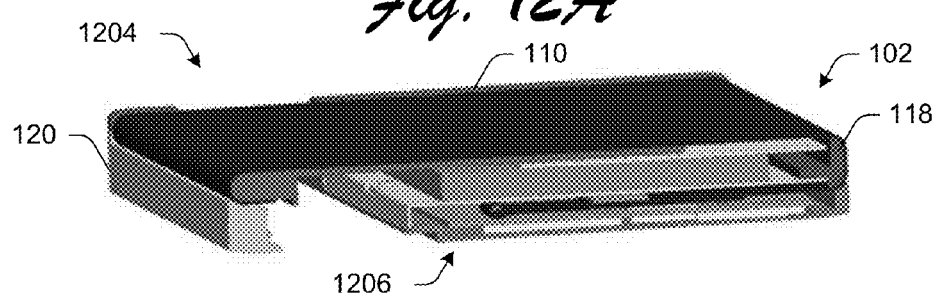
Figure 13A:
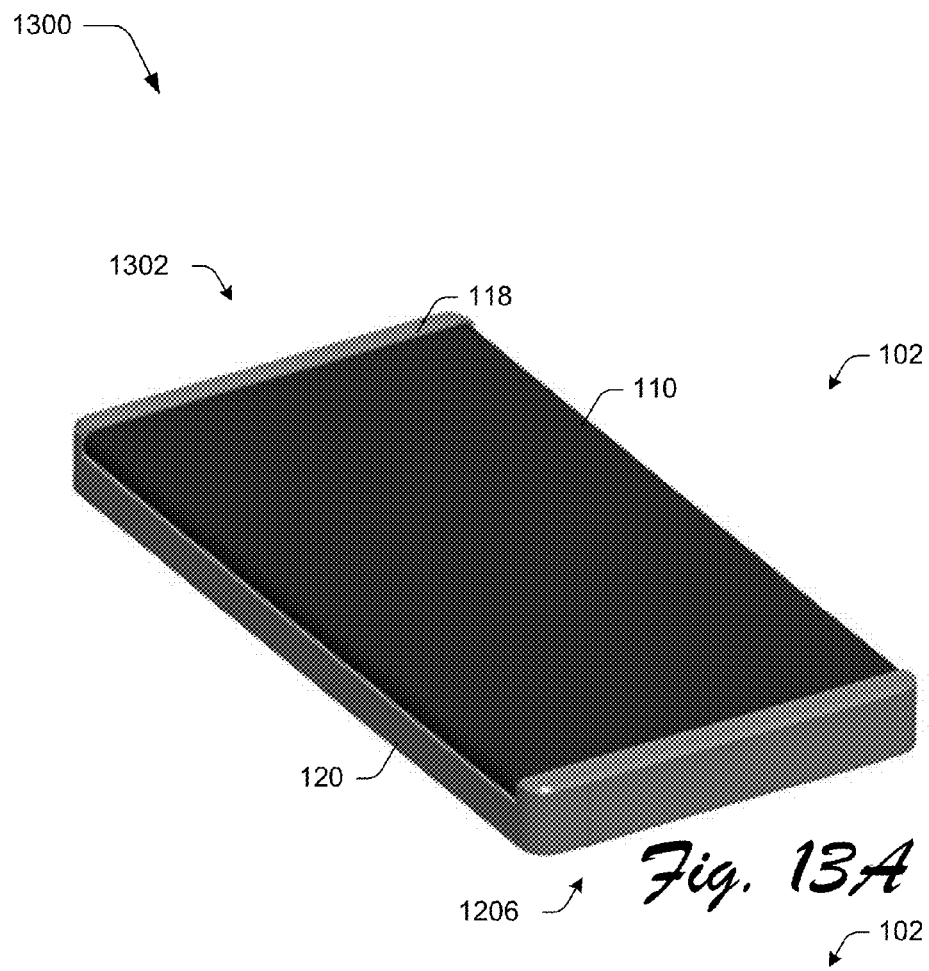
Figure 13B:
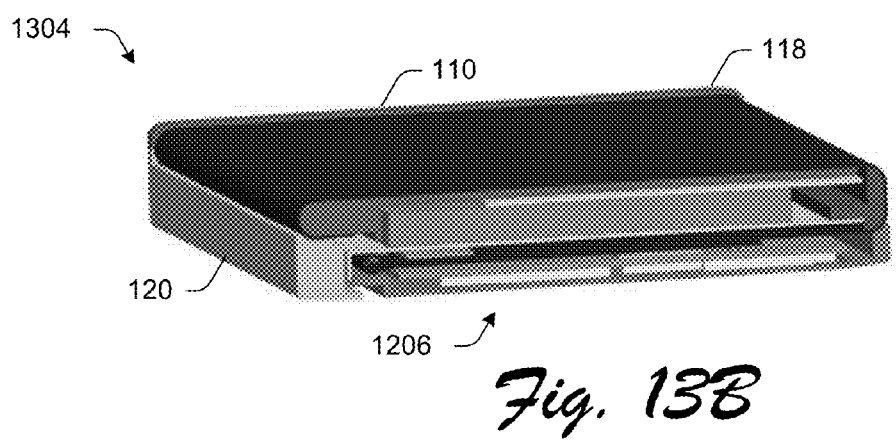

FIGS. 12A, 12B, 13A, and 13B depict example implementations 1200, 1300 in which the mobile computing device 102 of FIG. 1 includes first and second housings 118, 120 that are connected using a sliding arrangement. FIGS. 12A, 12B, 13A, and 13B include perspective 1202, 1302 and cut-away views 1204, 1304, respectively. The plurality of housing 118, 120 in this example are joined via a sliding mechanism 1206 that permits the first and second housings 118, 120 to slide in relation to each other. As shown in FIGS. 12A and 12B, the display device 110 may extend across both of the first and second housings 118, 120 when extended and retract into an interior of the first housing 118 when slid together as shown in FIGS. 13A and 13B.

Figure 14:
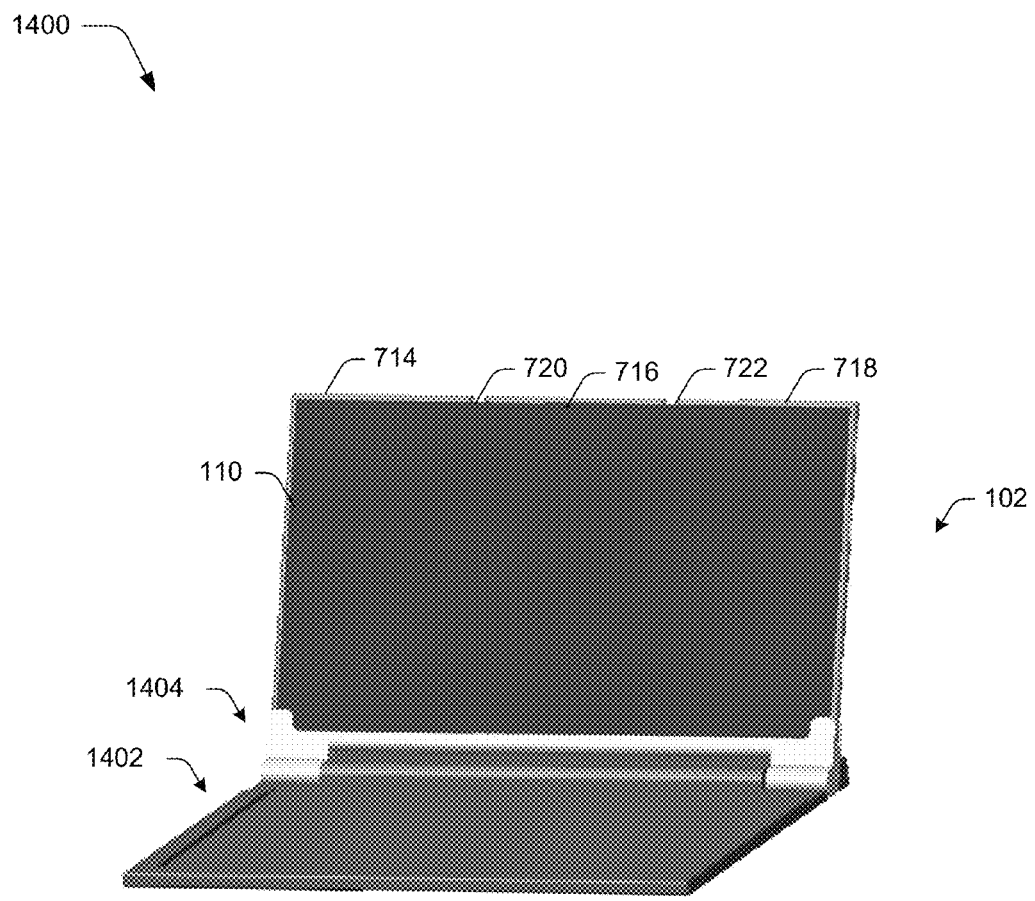
FIG. 14 depicts an example implementation showing a peripheral device as communicatively and physically coupled to the mobile computing device of FIGS. 7A and 7B.

FIG. 14 depicts an example implementation 1400 showing a peripheral device 1402 as communicatively and physically coupled to the mobile computing device 102 of FIGS. 7A and 7B. The mobile computing device 102 includes first, second, and third housings 714, 716, 718 along with first and second flexible hinge structures 720, 722 as previously described in relation to FIGS. 7A, 7B, 8A, 8B, 9A, 9B, and 9C. A peripheral device 1402 is illustrated as secured to the mobile computing device 102, which may be utilized to provide a variety of inputs, e.g., as a keyboard, gestures, use of a cover, and so forth.

The peripheral device 1402 may be secured to the mobile computing device 102 in a variety of ways. For example, the peripheral device 1402 may include a connection portion 1404 having a channel, into which, the mobile computing device 102 may be inserted when in the tablet mode 126 or other modes. The connection portion 1404 may be configured to form a removable physical connection, such as through a hook and slot arrangement, magnets (e.g., a flux fountain in which magnets are used to steer a magnetic field of other magnets to increase a retention force), plug and receptacle, mechanical binding through the use of protrusions, and so forth. The removable physical connection, for instance, may be formed between the connection portion 1404 and one or more of the first, second, and third housings 714, 716, 718. A variety of other examples are also contemplated without departing from the spirit and scope thereof.

Figure 15A:
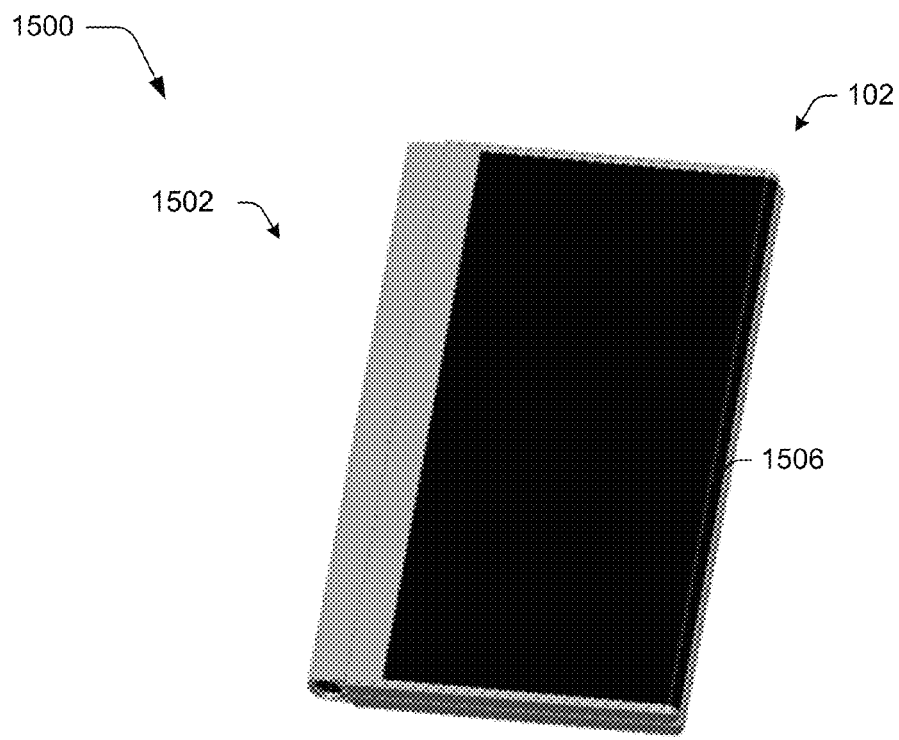
FIGS. 15A and 15B depict an example implementation in which a secondary display device is also included as part of the display device.
Figure 15B:
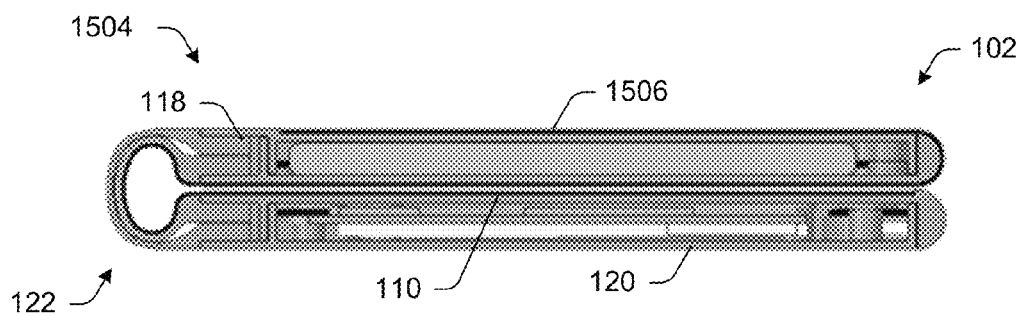

FIGS. 15A and 15B depict an example implementation 1500 in which a secondary display device is also included as part of the display device. This example is shown using a perspective view 1502 and a cut-away view 1504. In both view, the first and second housings 118, 120 are illustrated in a closed configuration such that the display device 110 is disposed internally between the housings.

A secondary display device 1506 is illustrated as disposed on the first housing 118 to be viewable when in this closed configuration. The secondary display device 1506 may be configured as the same or different from the display device 110, such as an "e-ink" or cholesteric display that consumes less power.

Figure 16A:
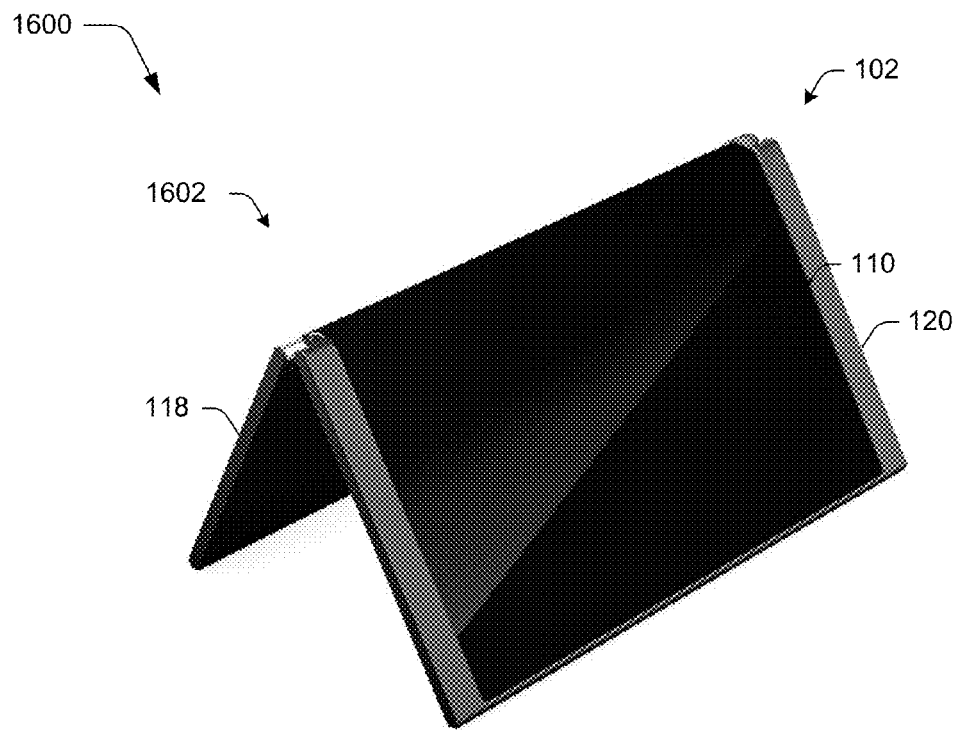
FIGS. 16A and 16B depict an example implementation in which an additional configuration supported by folding of the housing in relation to each other is shown.
Figure 16B:
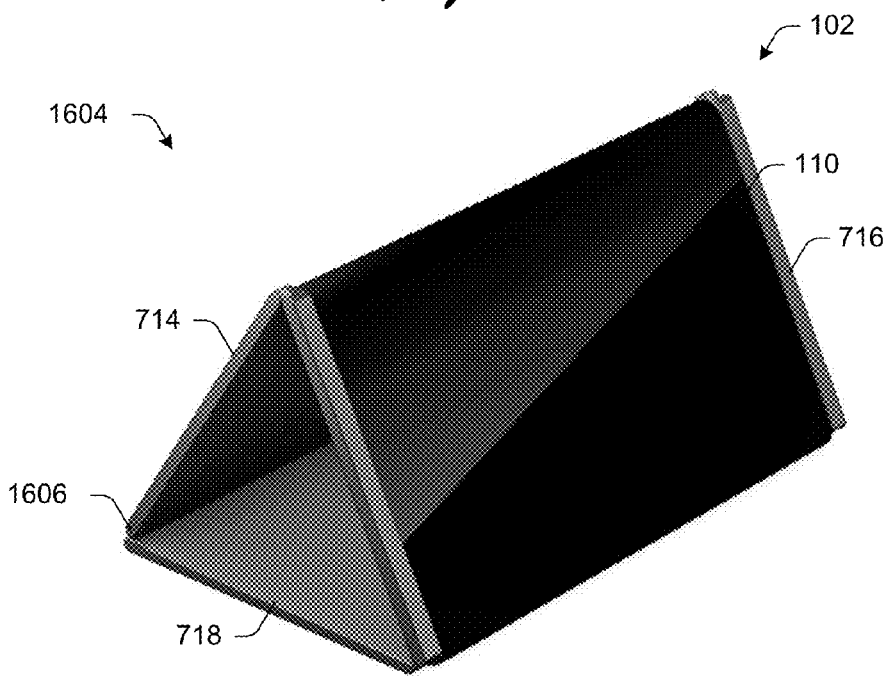

FIGS. 16A and 16B depict an example implementation 1600 in which an additional configuration supported by folding of the housing in relation to each other is shown. This example implementation includes a first multi-view configuration 1602 and a second multi-view configuration 1604. In the first multi-view configuration 1602, the first and second housings 118, 120 form a tent-like structure when placed on a surface. In this way, the display device 110 is viewable at opposing sides of the computing device 102.

In the second multi-view configuration 1604, the computing device 102 having first, second, and third housings 714, 716, 718 is shown. In this example, the third housing 718 is laid flat against a surface and as such a display device disposed on the third housing 718 is not viewable. However, the first and second housings 714, 716 form a tent-like structure (e.g., a "A" structure) such that the display device 110 is viewable on opposing sides of the computing device 102. A biasing structure 1606 may be included to secure the first and third housings 714, 718 to each other (e.g., through use of magnets, mechanical devices, and so on) and thus promote stability of the mobile computing device 102. A variety of other examples are also contemplated without departing from the spirit and scope thereof.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A mobile computing device comprising:
    a plurality of housings;
    a display device that is flexible; and
    a flexible hinge structure that:
        secures the plurality of housings to each other;
        permits the plurality of housings to rotate about an axis in relation to each other, the flexible hinge structure supporting a plurality of configurations of the plurality of housings in relation to each other, one said configuration positioning the plurality of housings along a single plane and at least a second said configuration positioning the plurality of housings stacked in relation to each other configured to expose at least a portion of the display device so as to be viewable;
        contacts the display device that is flexible; and
        supports a continuous viewing area of the display device that extends across the plurality of housings and the flexible hinge structure.

2. A mobile computing device as described in claim 1, wherein:
    each of the plurality of housings includes a first outer surface, on which, the display device is secured;
    the plurality of housings is configured to be positioned using the flexible hinge structure such that the first outer surfaces define the single plane; and
    the flexible hinge structure includes a first flexible member that has a first outer surface that, together with the first outer surfaces of the plurality of housings is continuous along the defined single plane through which the continuous viewing area of the display device extends.

3. A mobile computing device as described in claim 2, wherein:
    each of the plurality of housings includes a second outer surface that is opposite to the first outer surface;
    the plurality of housings are configured to be positioned using the flexible hinge structure such that the second outer surfaces define a second plane that is parallel to the single plane; and
    the flexible hinge structure includes a second flexible member that has a second outer surface that, together with the second outer surfaces of the plurality of housings is continuous along the second plane that is generally parallel to the defined single plane.

4. A mobile computing device as described in claim 2, wherein the first flexible member is configured to support a minimum bend radius of the display device.

5. A mobile computing device as described in claim 1, wherein the flexible hinge structure contacts the display device in a space between the plurality of housings and supports the display device in the space between the plurality of housings.

6. A mobile computing device as described in claim 1, wherein the at least second said configuration in which the plurality of housings are stacked is configured to expose the portion of the display device along a curvature of the flexible hinge structure.

7. A mobile computing device as described in claim 1, further comprising a biasing mechanism configured to bias positioning of the plurality of housings in a particular one of the plurality of configurations.

8. A mobile computing device as described in claim 7, wherein the biasing mechanism uses magnets or a mechanical device.

9. A mobile computing device comprising:
a display device that is flexible;
a plurality of housings; and
a plurality of flexible hinge structures that:
- secures the plurality of housings, one to another;
- permits the plurality of housings to rotate about an axis in relation to each other; and
- forms a continuous viewing area of the display device that extends across the plurality of housings and the plurality of flexible hinge structures by contacting the flexible display device in a space between the plurality of housings.

10. A mobile computing device as described in claim 9, wherein the plurality of housings include a first, second, and third said housing and the plurality of flexible hinge structures include first and second said flexible hinge structures and the continuous viewing area of the display device extends over the first, second and third said housings and the first and second said flexible hinge structures.

11. A mobile computing device as described in claim 9, wherein:
- each of the plurality of housings includes a first outer surface, on which, the display device is secured;
- the plurality of housings are configured to be positioned using the plurality of flexible hinge structures such that the first outer surfaces define a single plane; and
- each of the plurality of flexible hinge structures includes a first flexible member that has a first outer surface that, together with the first outer surfaces of the plurality of housings is continuous along the defined single plane through which the continuous viewing area of the display device extends.

12. A mobile computing device as described in claim 11, wherein:
- each of the plurality of housings includes a second outer surface that is opposite to the first outer surface;
- the plurality of housings is configured to be positioned using the flexible hinge structure such that the second outer surfaces define a second plane that is parallel to the single plane; and
- each of the plurality of flexible hinge structures includes a second flexible member that has a second outer surface that, together with the second outer surfaces of the plurality of housings is continuous along the second plane that is generally parallel to the defined single plane.

13. A mobile computing device as described in claim 11, wherein the first flexible member is configured to support a minimum bend radius of the display device.

14. A mobile computing device as described in claim 9, wherein the rotation of the plurality of flexible hinge structures supports a plurality of configurations of the plurality of housings in relation to each other, at least one said configuration involving positioning of the plurality of housings along a single plane and another said configuration in which the plurality of housings is stacked in relation to each other.

15. A mobile computing device as described in claim 9, wherein the rotation of the plurality of flexible hinge structures supports a plurality of configurations of the plurality of housings in relation to each other, at least one said configuration involving positioning of the plurality of housings along a single plane and another said configuration in which at least one of the plurality of housings is stacked in relation to each other and two or more of the plurality of housing are viewable by a user.

16. A mobile computing device as described in claim 9, wherein the rotation of the plurality of flexible hinge structures supports a plurality of configurations of the plurality of housings in relation to each other, at least one said configuration involving positioning of the plurality of housings along a single plane and another said configuration in which two or more of the plurality of housings is stacked in relation to each other and at least one of the plurality of housings is viewable by a user.

17. A mobile computing device comprising:
a flexible hinge structure that:
- secures housings of the mobile computing device to each other;
- permits the housings to rotate about an axis in relation to each other supporting multiple configurations of the housings in relation to each other, one said configuration positioning the housings along a single plane and at least a second said configuration positioning the housings stacked in relation to each other;
- contacts a flexible display device of the mobile computing device; and
- supports a continuous viewing area of the flexible display device that extends across the housings and the flexible hinge structure; and
a biasing mechanism configured to bias positioning of the housings in a particular one of the multiple configurations.

18. A mobile computing device as described in claim 17, wherein the at least second said configuration in which the housings are stacked is configured to expose at least a portion of the flexible display device so as to be viewable.

19. A mobile computing device as described in claim 17, wherein the at least second said configuration in which the housings are stacked is configured such that no portion of the flexible display device is viewable.

20. A mobile computing device as described in claim 17, wherein the flexible hinge structure contacts the flexible display device in a space between the housings and supports the flexible display device in the space between the housings.

* * * * *